US012647385B2

(12) United States Patent
Benardos et al.

(10) Patent No.: US 12,647,385 B2
(45) Date of Patent: Jun. 2, 2026

(54) PROXY-LESS PRIVATE CONNECTIVITY ACROSS VPC NETWORKS WITH PORT BASED ROUTING

(71) Applicant: Google LLC, Mountain View, CA (US)

(72) Inventors: Benjamin John Benardos, Sunnyvale, CA (US); Keyan Chen, Santa Clara, CA (US); Piotr Romański, Warsaw (PL); Mark Church, Austin, TX (US); Omer Hershenson, Tel Aviv (IL); Shunchao Gao, Santa Clara, CA (US); Jacek Marian Witkowski, Warsaw (PL); Anshuman Gupta, Sunnyvale, CA (US); Alok Kumar, Fremont, CA (US); Anna Berenberg, Saratoga, CA (US); Purvi Desai, Mountainview, CA (US)

(73) Assignee: Google LLC, Mountain View, CA (US)

( * ) Notice: Subject to any disclaimer, the term of this patent is extended or adjusted under 35 U.S.C. 154(b) by 41 days.

(21) Appl. No.: 18/423,530

(22) Filed: Jan. 26, 2024

(65) Prior Publication Data
US 2025/0247355 A1 Jul. 31, 2025

(51) Int. Cl.
*G06F 15/16* (2006.01)
*H04L 61/2503* (2022.01)
(52) U.S. Cl.
CPC ................................ *H04L 61/2503* (2013.01)

(58) Field of Classification Search
CPC ............. H04L 61/2503; H04L 61/4511; H04L 63/0421
USPC .................................................. 709/245–246
See application file for complete search history.

(56) References Cited

U.S. PATENT DOCUMENTS

| | | | |
|---|---|---|---|
| 2015/0032906 A1* | 1/2015 | Kweon ............... | H04L 61/5007 709/245 |
| 2017/0078771 A1* | 3/2017 | Lingampalli ...... | H04Q 11/0067 |
| 2022/0417204 A1* | 12/2022 | Rajput ............... | H04L 61/4511 |
| 2023/0123734 A1* | 4/2023 | Oxman ............... | H04L 61/2521 709/245 |
| 2023/0262025 A1* | 8/2023 | Krishan ............. | H04L 61/4511 709/245 |

* cited by examiner

*Primary Examiner* — Bharat Barot
(74) *Attorney, Agent, or Firm* — Lerner David LLP

(57) ABSTRACT

Proxy-less connectivity may be established between logically isolated networks, such as virtual private clouds (VPCs), within a cloud environment using port based routing over a data path. When a consumer network is coupled to a producer network via a data path, each unique consumer transport layer port in the consumer network may be mapped to a unique producer transport layer port in the producer network, such that all ports in the consumer network are exposed on a single IP address which maps to different IP addresses in the producer network. In this regard, data from any port in the consumer network is transmitted through the single IP address and over the data path to a specific port in the producer network.

18 Claims, 11 Drawing Sheets

| Consumer target IP and port | | Producer target workload and port |
|---|---|---|
| psc1 : 1001 | → | vm1 : 1000 |
| psc1 : 1002 | → | vm2 : 1000 |
| psc1 : 1003 | → | vm3 : 1000 |
| psc1 : 1004 | → | vm1 : 2000 |
| psc1 : 1005 | → | vm2 : 2000 |
| psc1 : 1006 | → | vm3: 2000 |

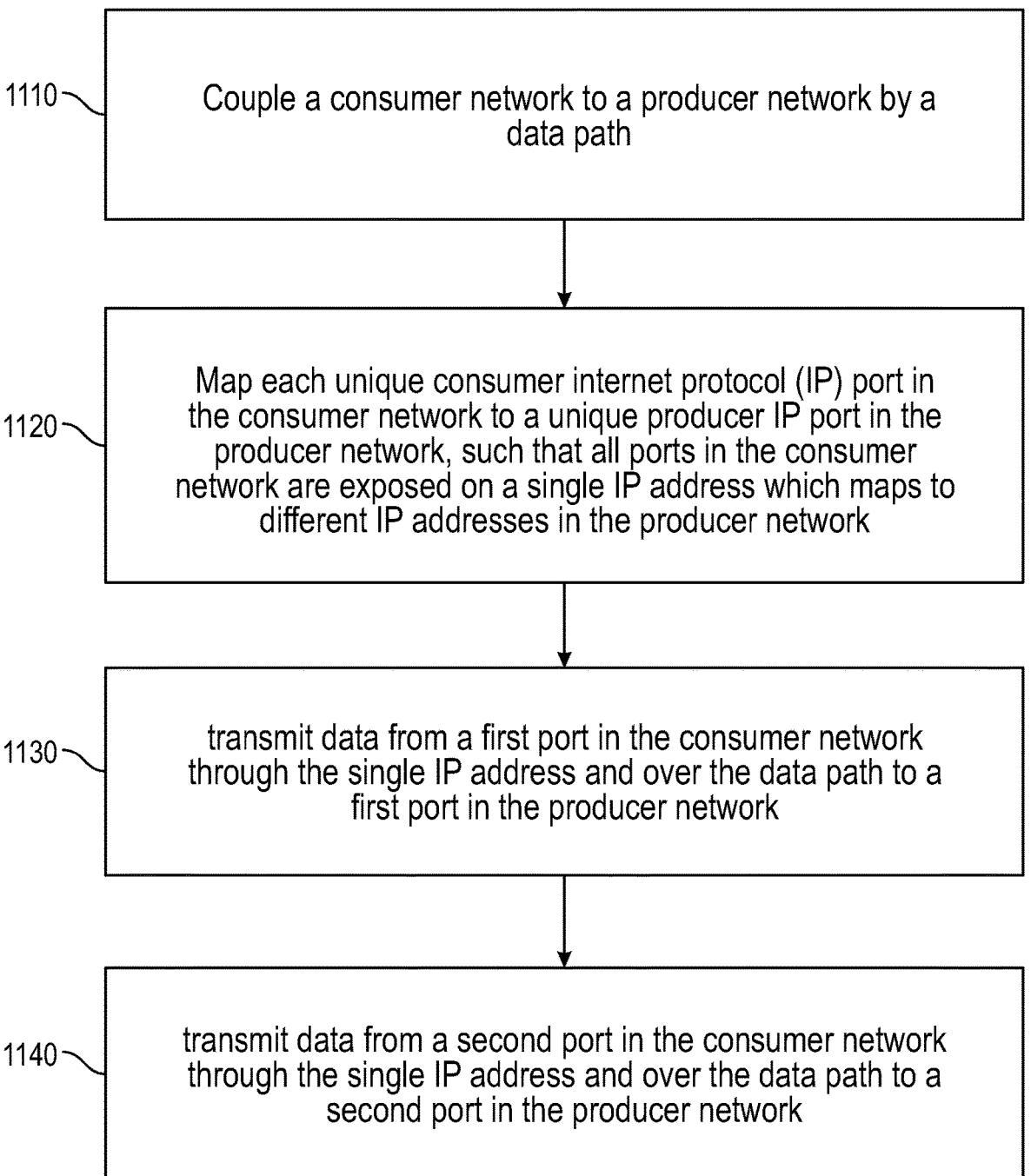

1110 — Couple a consumer network to a producer network by a data path

1120 — Map each unique consumer internet protocol (IP) port in the consumer network to a unique producer IP port in the producer network, such that all ports in the consumer network are exposed on a single IP address which maps to different IP addresses in the producer network 1130 — transmit data from a first port in the consumer network through the single IP address and over the data path to a first port in the producer network 1140 — transmit data from a second port in the consumer network through the single IP address and over the data path to a second port in the producer network

FIG. 11

PROXY-LESS PRIVATE CONNECTIVITY ACROSS VPC NETWORKS WITH PORT BASED ROUTING

BACKGROUND

A virtual private cloud (VPC) network can be conceptualized as a physical network which is virtualized within a cloud environment. The VPC network can consist of a VPC routing mechanism which connects to the external internet, and in turn routes traffic to various virtual machines or other endpoints within the VPC network. VPC networks can also be completely isolated from the external internet. The VPC network can be divided by groups, such as by a subnet, and each endpoint can further have an address related to the address of the subnet in which it exists.

Private connectivity between two VPC networks could be achieved using (i) VPC network peering and (ii) virtual private network (VPN) connections. In VPC network peering, VPC networks within one cloud environment could be connected internally, without traffic leaving the cloud environment and traversing public internet. VPC Peering and VPNs provide bidirectional access which can be less secure for certain service providers/consumers.

When using VPN connections, non-overlapping internet protocol (IP) ranges are required across the consuming compute endpoints, such as virtual machine (VM) instances, and serving compute endpoints, such as load balancers or backends. In the case of VPC peering, as full mesh connectivity between the two peered VPC networks is achieved, subnet ranges have to be non-overlapping, not only between the two networks that were peering, but also between any other networks peered with the peered network. Additionally, the overall size of the combined network becomes very large as the number of peering connections increases. Non-overlapping subnet or other address ranges for each subnet or network connecting would be required for VPC peering.

These solutions to VPC cross-network private connectivity require management of specific IP addresses or subnet ranges, and do not allow for scalability.

SUMMARY

Aspects of the disclosed technology provide for sharing database-like services between VPCs. Each database may include multiple shards. Secure and proxyless connectivity is provided to specific database shards via port-based routing. A service attachment may be created in a producer VPC to share a service. A mapping of ports, such as transmission control protocol (TCP) or user datagram protocol UDP ports, to each service virtual machine instance is created. A consumer VPC receives the shared service by creating a service endpoint. The producer VPC may connect to specific service instances by connecting to a specific TCP/UDP port.

One aspect of the disclosure provides a method of communicating between networks on a cloud service. The method may include coupling a consumer network to a producer network by a data path; mapping each unique consumer transport layer port in the consumer network to a unique producer transport layer port in the producer network, such that all ports in the consumer network are exposed on a single IP address which maps to different IP addresses in the producer network; transmitting data from a first port in the consumer network through the single IP address and over the data path to a first mapping of virtual machine and port in the producer network; and transmitting data from a second port in the consumer network through the single IP address and over the data path to a second mapping of virtual machine and port in the producer network. The single IP address of the consumer network may be an endpoint of the data path.

In some examples, the consumer network comprises a first plurality of workloads and the producer network comprises a second plurality of workloads. The producer network may include a plurality of virtual machines, wherein each virtual machine in the producer network exposes one or more ports. The consumer network and the producer network may each comprise a virtual private cloud. The consumer network and producer network may run on a distributed computing platform.

In some examples, a service to be accessed in the producer network may be a container. In some examples, a service to be accessed in the producer network is a group of virtual machines.

Another aspect of the disclosure provides a system, comprising a consumer network comprising a service endpoint and a first plurality of nodes; and a producer network comprising a service attachment and a second plurality of nodes, wherein a data path is established between the service endpoint and the service attachment, and each unique consumer transport layer port in the consumer network is mapped to a unique producer transport layer port in the producer network, such that all ports in the consumer network are exposed on a single IP address associated with the service endpoint.

The service endpoint may be configured to transmit data destined for any of different IP addresses in the producer network. The service endpoint may be configured to transmit data from a first port in the consumer network through the single IP address and over the data path to a first mapping of virtual machine and port in the producer network, and to transmit data from a second port in the consumer network through the single IP address and over the data path to a second mapping of virtual machine and port in the producer network.

In some examples, the consumer network comprises a first plurality of workloads and the producer network comprises a second plurality of workloads. In some examples, the producer network comprises a plurality of virtual machines, wherein each virtual machine in the producer network h exposes one or more ports. In some examples, the consumer network and the producer network each comprise a virtual private cloud. In some examples, the consumer network and producer network run on a distributed computing platform.

In some examples, a service to be accessed in the producer network may include at least one of a container, an internal load balancer, or a network endpoint group.

BRIEF DESCRIPTION OF THE DRAWINGS

FIG. 2 illustrates an example port mapping between ports of each of the coupled networks according to aspects of the disclosure.

FIG. 11 is a flow diagram illustrating an example method of communication using port-based routing though proxy-less coupled private networks according to aspects of the disclosure.

DETAILED DESCRIPTION

The disclosed technology can be used to connect networks belonging to different users or owners, without the use of virtual private networks or VPC peering. The networks can be VPC networks which can all run on a platform provided by a single cloud computing provider. Some networks can be deemed "producer" networks while others may be deemed "consumer" networks depending on the network producing, providing, consuming, or requesting a service.

Proxy-less connectivity may be established between logically isolated networks, such as virtual private clouds (VPCs), within a cloud environment using port based routing over a data path. When a consumer network is coupled to a producer network via a data path, each unique consumer transport layer port in the consumer network may be mapped to a unique producer transport layer port and virtual machine in the producer network, such that all ports in the consumer network are exposed on a single IP address which maps to different virtual machines and ports in the producer network. In this regard, data from any port in the consumer network is transmitted through the single IP address and over the data path to a specific virtual machine and port in the producer network.

Through the use of the technology disclosed, services can be connected from a producer's network to multiple consumers' networks without using public IPs. Each service to be accessed in a producer's network can be setup or configured in a consumer's network once. Once the setup or configuration is completed, depending on the nature of the service, data can be directly routed to the service or be "network address translated" and then sent to the service.

Figure 1:
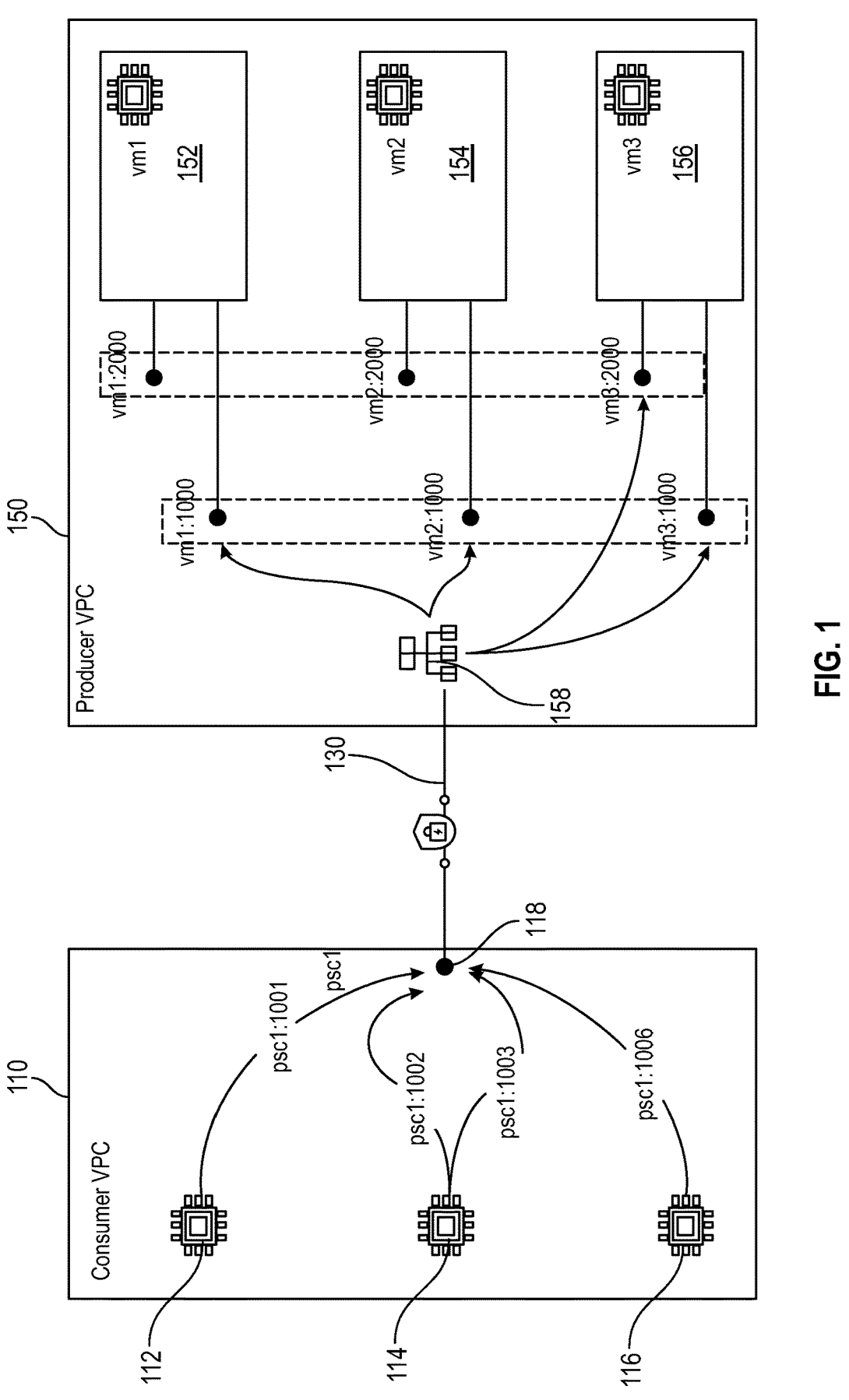
FIG. 1 illustrates an example of transmitting data through proxy-less coupled networks according to aspects of the disclosure.

FIG. 1 illustrates an example of transmitting data through proxy-less coupled networks. As each network may be isolated, externally transmitting data from one network to the other may include communication over the Internet. Client-side port-based routing, as illustrated in this example, enables consumers to route their traffic to a specific producer backend target based on the destination port, using a single service connection endpoint. This may be useful for scaling out third-party applications while maintaining high performance. For example, the client-side port-based routing provides an ability to map target ports set by the consumer workloads to specific workloads and ports on the producer side. For cluster-based applications utilizing a cluster of servers, the client chooses which individual server to send traffic to. Clients may have the entire list of servers stored so that they can reach any server directly.

In this example, the networks include virtual private cloud (VPC) networks, including consumer VPC 110 and producer VPC 150. The VPCs 110, 150 can be executed or run on a distributed computing platform, such as for example, Kubernetes or other cloud platforms. The distributed computing platform can be hosted on a combination of virtual or physical machines by a cloud provider. Each network can be run on a software-defined networking (SDN) stack, which can be a software layer within the "layers" on which the VPC network is run or established. SDN is an approach to network management that enables dynamic and programmatically efficient network configurations in order to improve network performance and monitoring, and thus enabling it to provide efficiencies in cloud computing environments.

The VPCs 110, 150 may communicate over a connection 130 established between the networks. The connection 130 may be, for example, a data path established between endpoints 118, 158 of the respective networks. The endpoints 118, 158 may be, for example, virtual machines, virtualized containers, virtualized computing nodes, etc.

The connection 130 may be a private service connection which allows for services in one network to be accessed by another network while remaining within the cloud provider's domain. In one example, producer network 150 can create a service, as required, within its own network to be accessed by another network. The network can be created at varying layers. In some examples, a layer 4 internal load balancer (ILB) service or a layer 7 ILB service can be used or created. Producer network 150 can then create a service attachment, described further below in connection with FIG. 3, that can point to the service created and can also provide a network address translation (NAT) Classless Inter-Domain Routing (CIDR). The NAT CIDR range can be allocated from producer network 150 and can be used by network 110 to communicate with the service established in producer network 150. Consumer network 110 can create a service endpoint that connects to service attachment. The service endpoint can have a service private VIP address which can be allocated from available addresses of consumer network 110. Instances in consumer network 110 can use the address to "talk" to the service attachment. Service endpoint 118 can request the establishment of the private service connection, and service attachment can accept this request to complete the establishment of the same. In some examples, a control plane process can be initiated or be used. The control plane processes can configure the connectivity on the data plane to allow connections to be established.

Upon establishment of the private service connect session, data flow is enabled between the networks. An endpoint in the consumer network 110 talks to the service private VIP address in their network and it reaches the service attachment in producer network 150.

Each VPC 110, 150 may include one or more logical nodes, with each node having one or more ports. Destination ports set by consumer workloads in the traffic they originate to the producer network 150 may be referred to as client ports, while ports that the producer target workloads listen to may be called ports. In this example, consumer VPC 110 includes instances 112, 114, 116. Producer VPC 150 includes virtual machines 152, 154, 156. Each virtual machine 152, 154, 156 may have a single IP address. In the example shown, each virtual machine 152, 154, 156 in the producer network 150 has two client ports, identified as 1000 or 2000, exposed through the IP address of their respective virtual machine. While only a few logical nodes are shown within each network, it should be understood that each network may include any number of virtual machines, instances, or other logical nodes, and that the number of nodes within one network may be different from the number of nodes in a connected network.

The consumer network 110 uses a single IP address, such as for the endpoint 118 which may be mapped to a DNS hostname, to send traffic to the producer network 150. Each port in the consumer VPC 110 maps to specific port in the producer VPC 150. In contrast to typical L4 load balancing, all ports on the consumer VPC 110 are exposed on a single internet protocol (IP) address which maps to different virtual machines and ports in the producer VPC 150. The IP addresses may be "physical" IP addresses or a virtual internet protocol (VIP) addresses. Further, various IP protocols can be used. For example, an Internet Protocol Version 6 (IPv6) or Internet Protocol Version 4 (IPv4) protocol can be used. An IPV6 address is a 128-bit alphanumeric value that identifies an endpoint device in an IPV6 network. IPv6 is the successor to a previous addressing infrastructure, IPv4. An IPV6 address is a numeric label that is used to identify and locate a network interface of a computer or a network node participating in a computer network using IPv6. IP addresses are included in the packet header to indicate the source and the destination of each packet. The IPV4 address is a 32-bit number that uniquely identifies a network interface on a system.

FIG. 2 illustrates an example port mapping between the consumer VPCV 110 and the producer VPC 150 of FIG. 1. The example port mapping lists consumer ports 1001-1006. The consumer ports 1001-1006 may each be from the same node, different nodes, or some combination. In this example, referring back to FIG. 1, the port 1001 belongs to instance 112, ports 1002 and 1003 belong to instance 114, and port 1006 belongs to instance 116.

Each of the consumer ports 1001-1006 listed in the mapping of FIG. 2 is mapped to a producer target workload and port. For example, referring back to FIG. 1, each consumer port 1001-1006 is mapped to a specific port of one of the virtual machines 152, 154, 156. In particular, consumer port 1001 is mapped to a first port vm1:1000 of virtual machine 152; consumer port 1002 is mapped to a first port vm2:1000 of virtual machine 154, a third consumer port 1003 is mapped to a first port vm3:1000 of virtual machine 156; etc. Despite that traffic from various consumer ports in various instances 112-114 of FIG. 1 is being transmitted to specific client ports in producer VPC 150, the consumer ports are all exposed through the same IP address for the endpoint 118 of the consumer VPC 110.

Using port-based routing, as described herein, may be beneficial in that it provides for higher scale and resiliency, reduced cost, and lower latency. For example, a server application provides a specific port to a client workload to enable it to route and load-balance the traffic to an application shard. Routing to different shards helps scale out even stateful services, such as databases, removes bottlenecks, and improves resiliency. Moreover, there is no need to configure and pay for individual forwarding rules for each of the different shards, and no need to deploy additional proxies at the producer side to re-route requests. Further, there is no performance penalty when using additional proxies at the producer to re-route the traffic to the appropriate shard.

Figure 3:
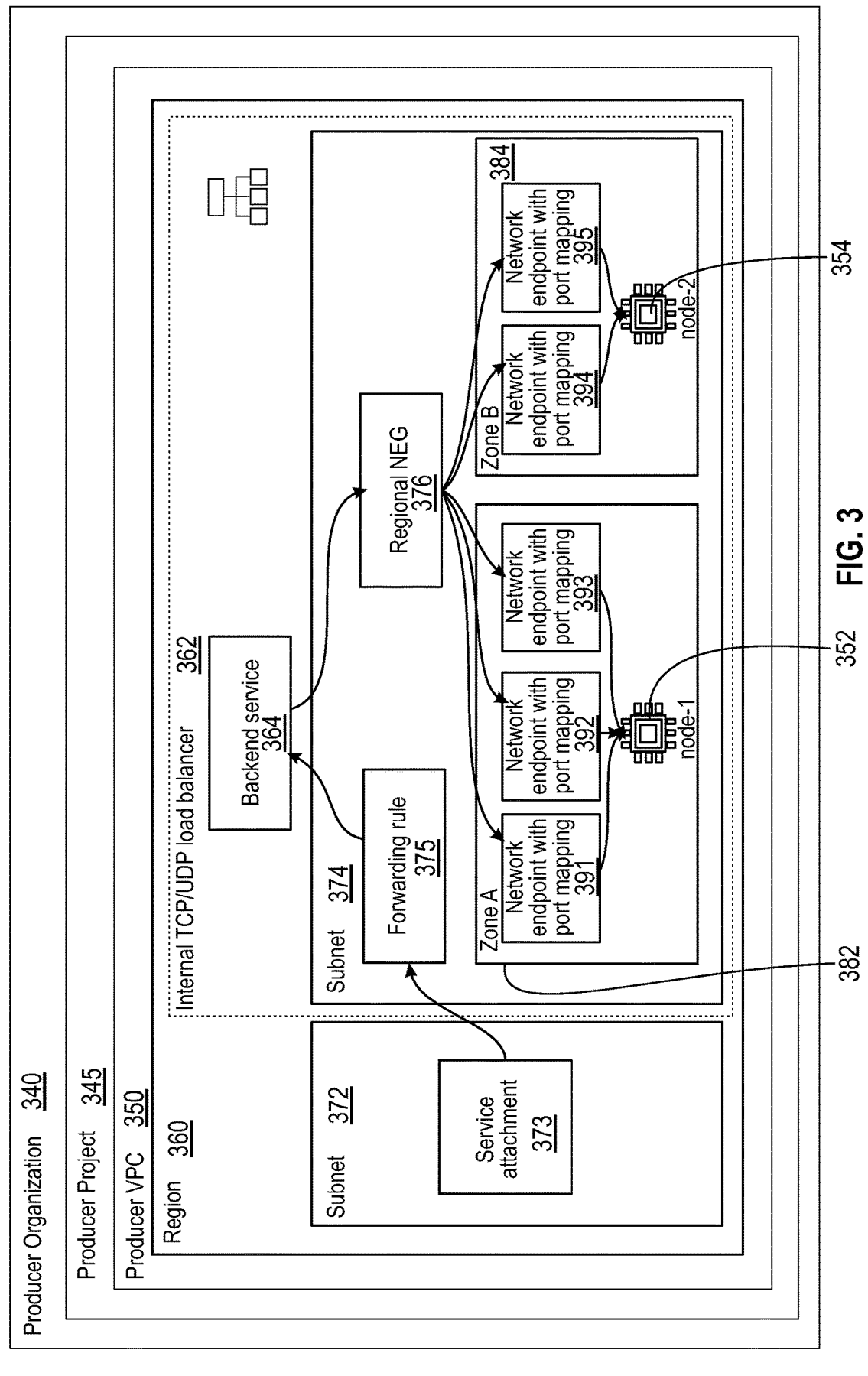
FIG. 3 illustrates an example of routing data received at the producer network using a service attachment, according to aspects of the disclosure.

FIG. 3 illustrates an example of routing data received at the producer network 350 using a service attachment 373 and regional Network Endpoint Groups (NEGs) 376. A shown, producer VPC 350 is part of a producer project 345 within a producer organization 340. The producer VPC 350 include one or more regions 360, and each region 360 may have one or more subnets 372, 374. In this example, the service attachment 373 is included within a first subnet 372 while second subnet 374 is part of a protocol forwarder 362 and includes a forwarding rule 375, the regional NEG 376, and instances 352, 354 in different zones 382, 384. Network endpoints 391, 392, 393, 394, 395 attached to the NEG 376 contain the target instance 352, 354, and the mapping between the client-ports and the ports. The NEG 376 may be part of an internal protocol forwarder 362, such as a TCP/UDP load balancer, connected to the service attachment 373 to expose the service to consumers.

The instances 352, 354 may be any type of compute nodes, and can be referred to as a "service" which is intended to be accessed by the consumer network. In other examples, the internal protocol forwarder 362 which can provide or control access to the compute nodes, can be referred to as a "service" which is intended to be accessed by consumer network. In some examples, the combination of the internal protocol forwarder 362 and associated compute nodes, e.g. instances 352, 354, can be referred to as the service. The internal protocol forwarder 362 can be a load balancer to balance availability of resources within a network, computational power and capabilities, or balance incoming and outgoing connections and/or requests.

Service attachment 373 can be created within the producer network 350. The service attachment references the producer forwarding rule 375. Service attachment 373 can be a construct or module which can run within a VPC network and can contain information about a load balanced service. In some examples, such as in the case of layer 3 or 4 services within the 7 layered Open System Interconnection (OSI) layered model, a Network Address Translation (NAT) range can be specified in order to be reserved for this service. A service within the producer network can create a service attachment in order to expose the service to the consumer network.

Figure 4:
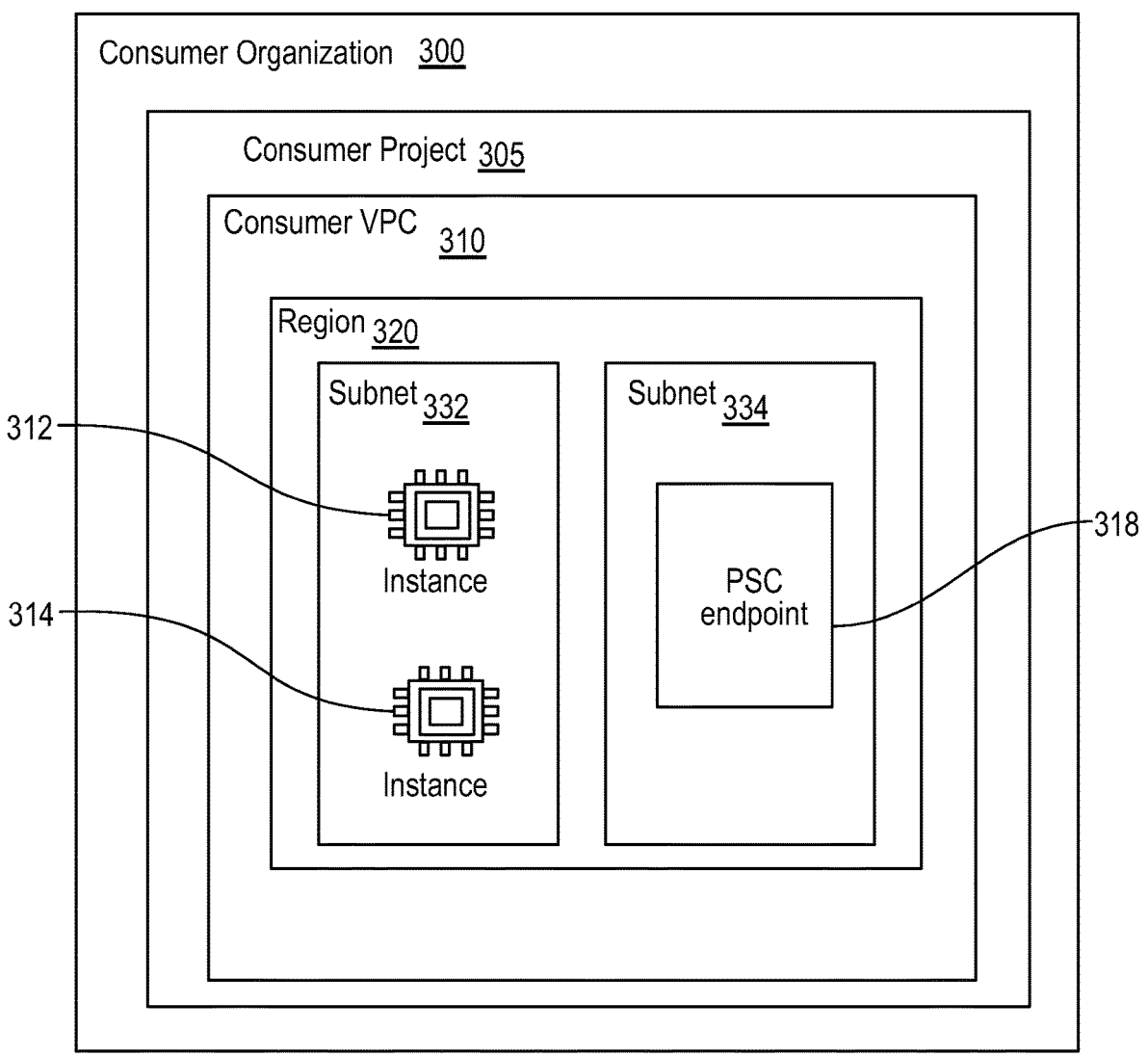
FIG. 4 illustrates an example of an endpoint within the consumer network, according to aspects of the disclosure.

FIG. 4 illustrates an example of an endpoint 318 within the consumer network, shown as consumer VPC 310 within a consumer project 305 in a consumer organization 300. The consumer VPC 310 may include one or more regions 320, and each region 320 may include one or more subnets 332, 334. In this example, compute nodes such as instances 312, 314 are in a first subnet 332 while a private service connection endpoint 318 is in a second subnet 334. The compute nodes can be part of a container-orchestration system or distributed computing system. The consumer deploys a single private service connection endpoint 318, connected to the producer's service attachment 373 (FIG. 3). Client workloads, such as instances 312, 314, send traffic to the endpoint 318 IP address, with the different client ports defined on the producer as destination ports, to target specific producer instances.

An owner, user, administrator or controller of consumer VPC 310 can create a service connection in order to connect to a service attachment which within a producer network. Private service connection endpoint 318 can be a construct, module, or software which is instantiated, or otherwise run or established, within a network. It can specify connections to a service attachment, further explained below, and can contain information relevant to how the service is exposed inside network 310, such as for example, the virtual internet protocol (VIP) address of the load balanced service or other information. The service connect endpoint 318 can also be referred to as a service endpoint or service connect module. A service endpoint can also have a server endpoint VIP associated with it. When the consumer chooses to create an endpoint to connect to the service over its chosen VIP, a DNS entry may be automatically created for the consumer that resolves to that chosen VIP.

In some examples, the consumer VPC 310 may include a Domain Name System (DNS) module coupled or integrated with service endpoint 318. The DNS module can contain an index of various domain names or other pointers and IP or other addresses associated with those domain names and pointers. The service endpoint can contain private entries within the DNS module which can be used to establish the private service connection.

Figure 5:
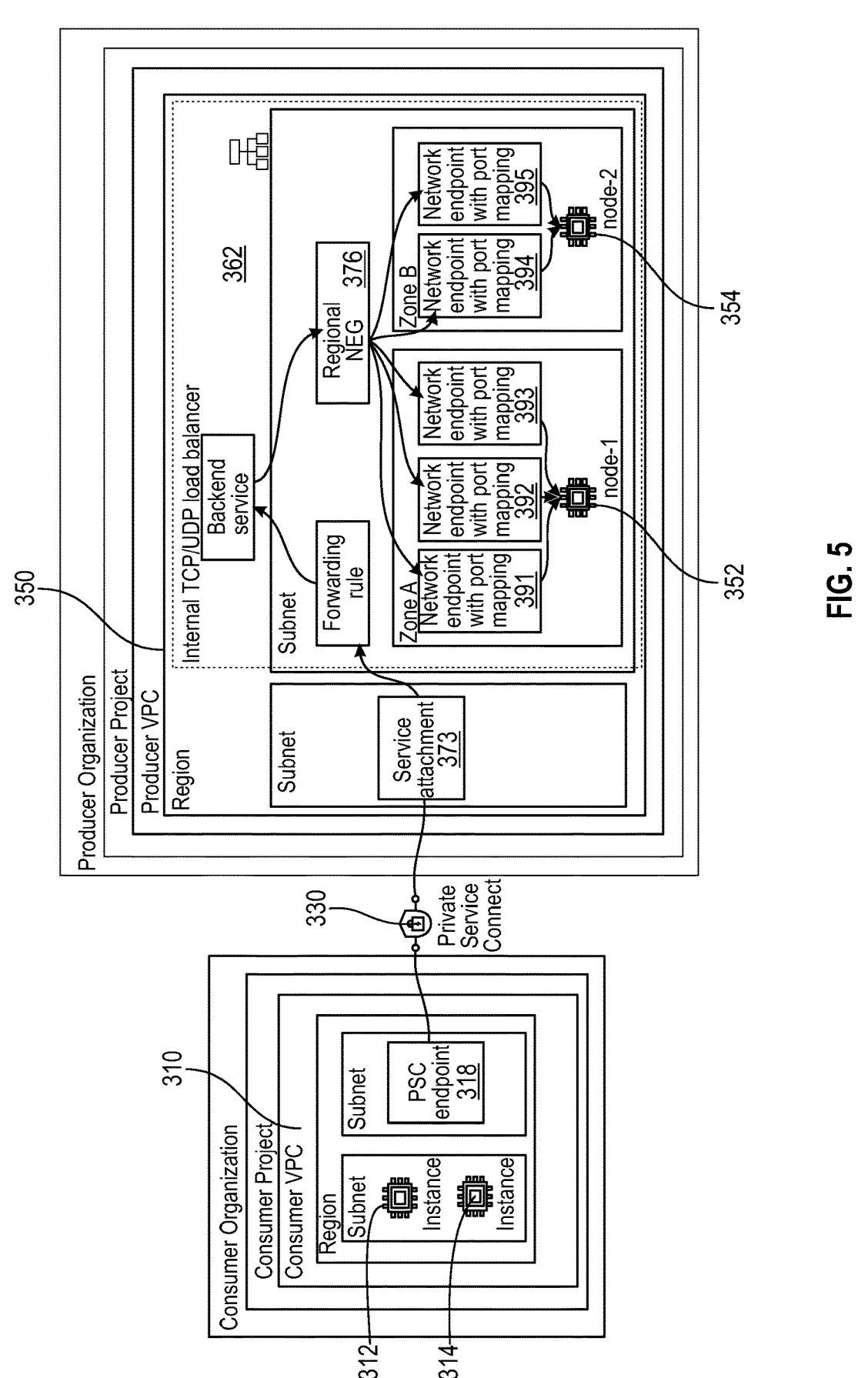
FIG. 5 illustrates an example end-to-end architecture including the consumer network and the producer network according to aspects of the disclosure.

FIG. 5 illustrates an example end-to-end architecture including the consumer VPC 310 of FIG. 4 and the producer VPC 350 of FIG. 3. The VPC 310 establishes a private service connection 330 with the producer VPC 350. For example, the producer VPC 350 shares an address, such as a uniform resource locator (URL), for the service attachment 373 with the consumer VPC 310. The consumer VPC 310 uses this address to establish a connection with the producer. To configure the end-to-end architecture, a consumer may create one or more endpoints 318, and attach the one or more endpoints 318 to the NEG 376 through service attachment 373 and protocol forwarder 362. A static internal IP address may be created for use by the consumer endpoint 318. The consumer endpoint 318 connects to the producer service attachment 373.

According to some examples, the architecture may be updated. For example, if an instance 352 is replaced, the network endpoint 391, 392, 393 may be removed and re-added to the NEG 376 with the new instance. If a port mapping, such as for a consumer port, client port, or both, needs to change, the network endpoint may be removed and re-added to the NEG with the new mapping. Network endpoints can be added or removed individually from the same NEG 376 without having to recreate the NEG. For example, a specific network endpoint can be removed from a NBG by specifying the client_port, which uniquely identifies a network endpoint. As another example, a specific network endpoint can be removed from a NEG by specifying the instance (or IP) and the port, which uniquely identifies a network endpoint. As another example, all network endpoints associated with an instance can be removed from a NEG by specifying the instance.

Figure 6:
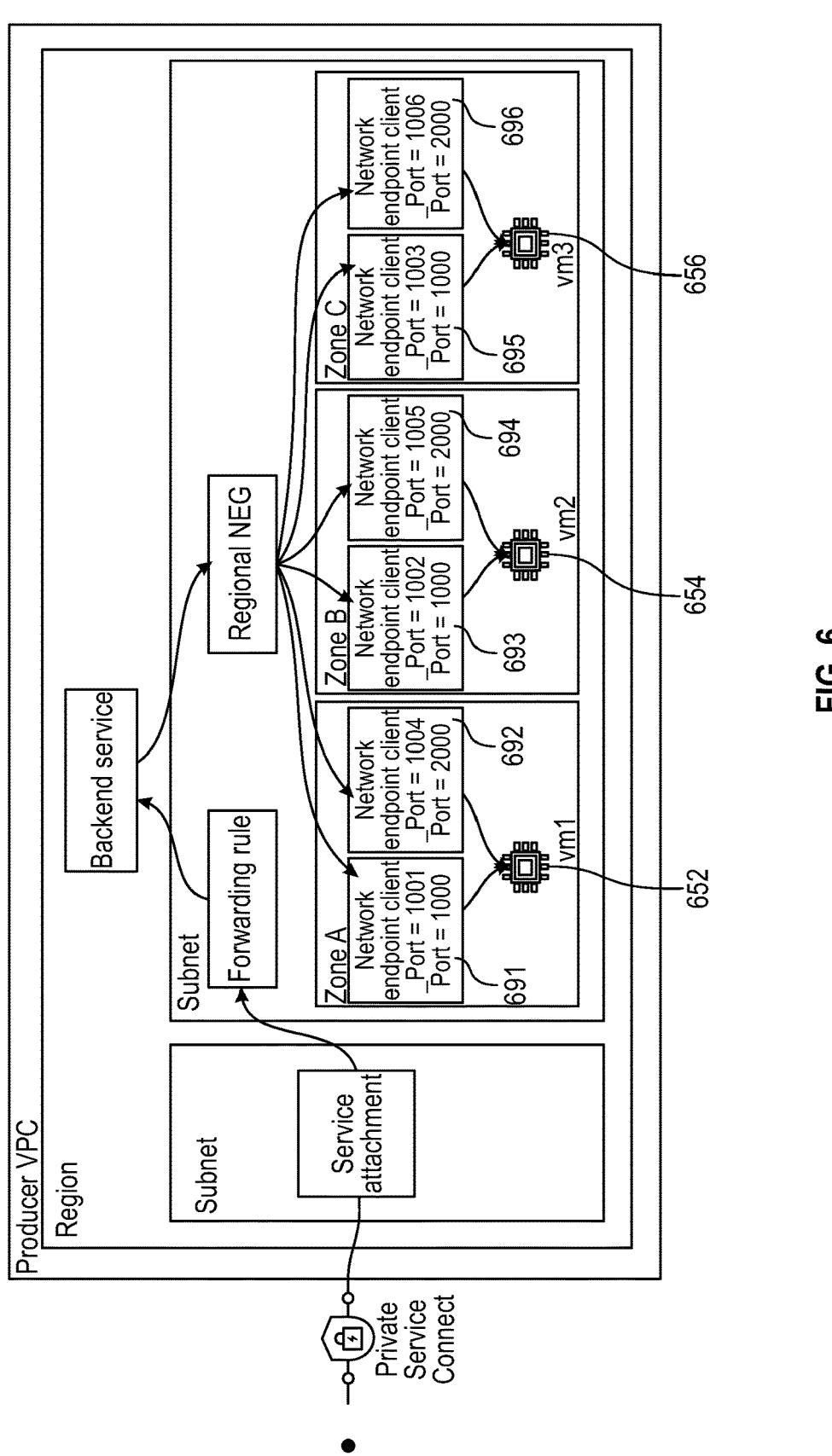
FIG. 6 illustrates an example end-to-end architecture with consumer ports mapped to specific client ports of the producer network, according to aspects of the disclosure.

FIG. 6 illustrates the example producer network corresponding to the configuration of FIG. 1, with customer network points mapped at the network endpoints using the mapping of FIG. 2. For example, virtual machines 652, 654, 656 each include two ports, identified as 1000 and 2000 respectively. For the first virtual machine 652, network endpoints 691, 692 store mappings of client ports to each port 1000, 2000 of the virtual machine 652. Network endpoints 693, 694 and 695, 696 similarly serve respective virtual machines 654, 656.

Figure 7:
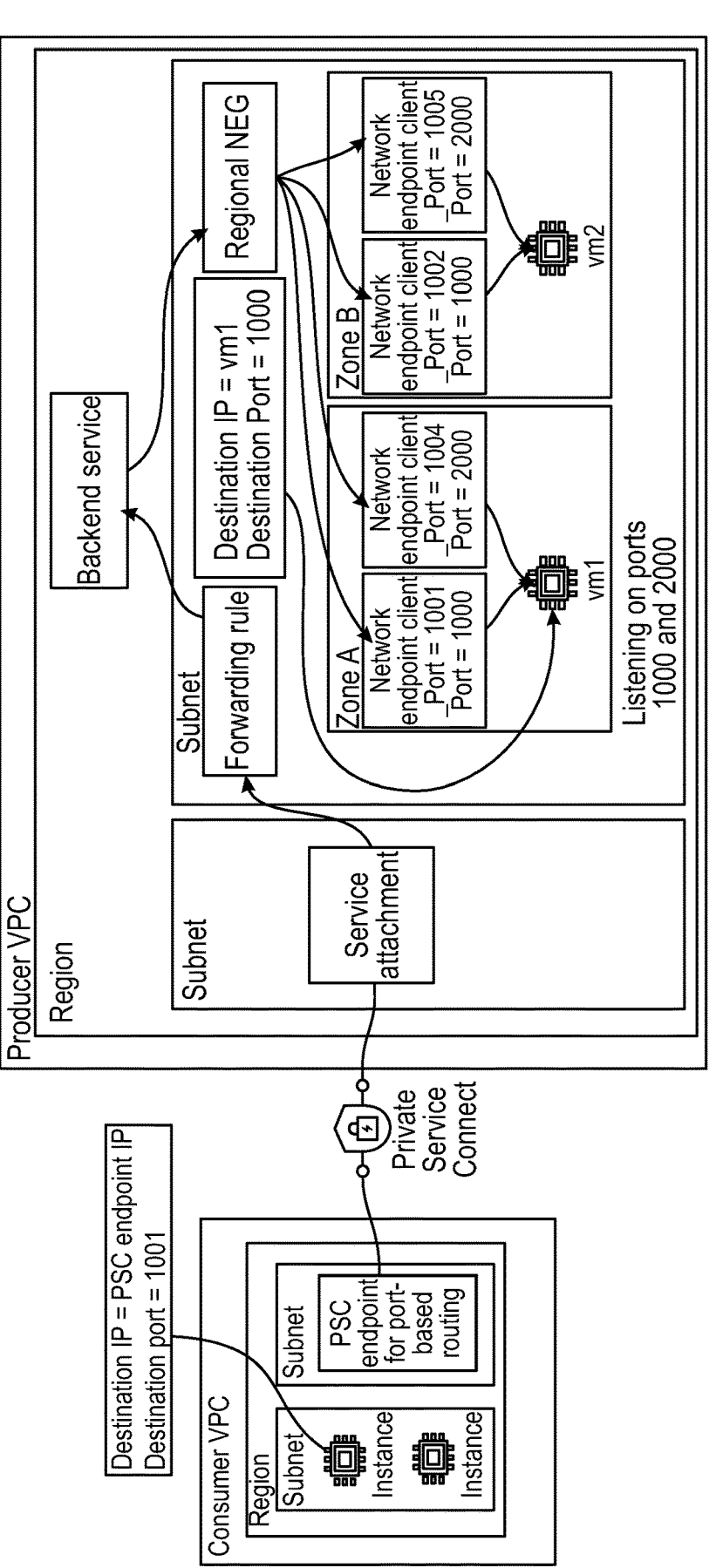
FIG. 7 illustrates an example data flow using the end-to-end architecture of FIG. 6.

FIG. 7 illustrates an example data flow using the end-to-end architecture of FIG. 6. Consumer source workloads send packets destined for the private service connection endpoint IP and a client port as the destination port. On the producer side, private service connection looks at the client port to determine the target instance to send the packets to. Before sending the packet to the target instance, private service connection translates the destination IP to the instance IP, and the client port to the port.

For consumption of managed database services, clients in consumer projects can reach out via private service connection consumer endpoint. The consumer endpoint maps to a service attachment which forwards the service discovery request to the L4-internal load balancer (ILB) forwarding rule and backend service. The backend server responds to this initial service discovery request from this client with a list of currently active port references (e.g.: port1, port2, . . . ) corresponding to a shard where subsequent requests should be routed. There is application code running inside the client that chooses a port from the list of active ports that were learnt from the response to the discovery request. Subsequent requests from the client are made using this port reference to the port-based routing private service connection deployment. The L4 ILB dataplane remaps the destination port to the configured serving port before traffic reaches the backend instance.

Figure 8:
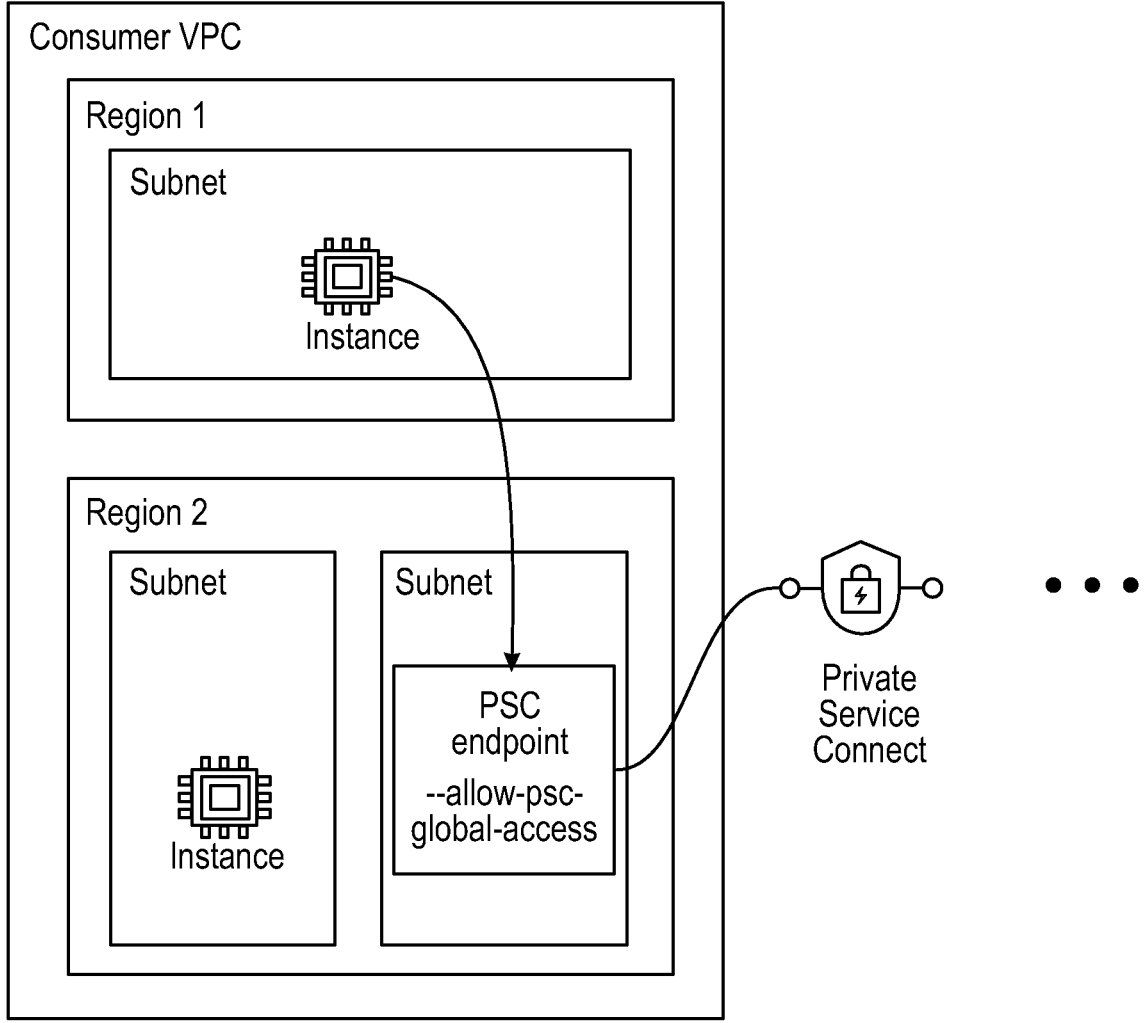
FIG. 8 illustrates an example of supporting global access using port-based routing according to aspects of the disclosure.

FIG. 8 illustrates an example of supporting global access using port-based routing. A consumer source workload can reach provider targets via port-based routing by using a private service connection endpoint in a different region, configured with global access. In this regard, a private service connection endpoint can be in a different region than an instance from which it is routing traffic.

Figure 9:
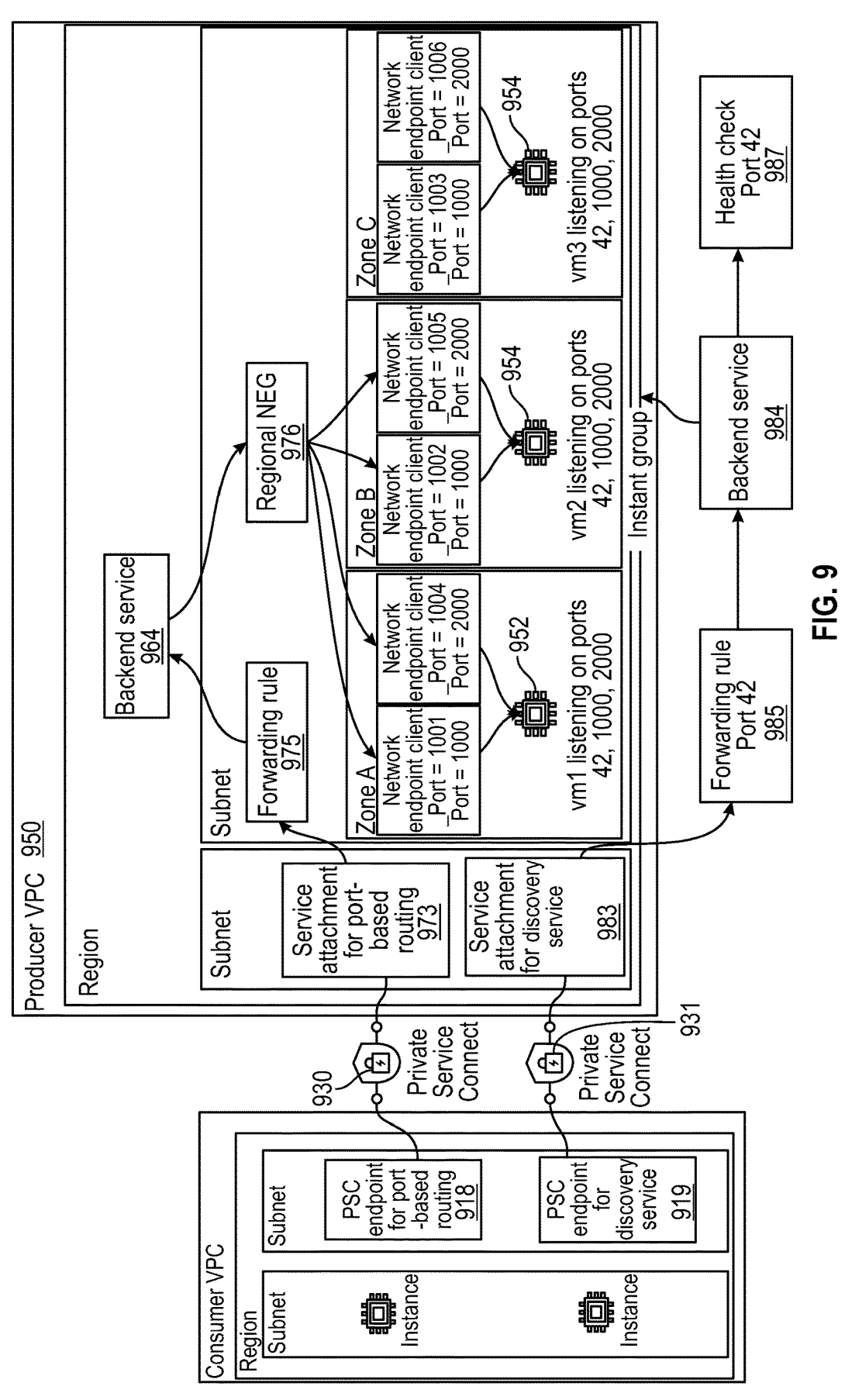
FIG. 9 illustrates an example of a non-port-based routing connection implemented in parallel with the end-to-end port-based routing architecture of FIG. 6.

In some examples, a non-port-based routing connection can be implemented in parallel with the port-based routing architecture. For example, a second service offered by the producer may be executed using non-port-based routing. As shown in FIG. 9, a second service attachment 983 is deployed in producer VPC 950, in addition to service attachment 973 used for port-based routing. In this example, the second service attachment 983 is used for discovery. For example, the second service offered by the producer VPC 950 may be a discovery service, which clients use during initialization to retrieve metadata from the producer VPC 950. Such metadata may include cluster topology, advertised ports, etc. The second service attachment 983 communicates with nodes 952, 954, 956 though backend service 984 based on forwarding rule 985. Any producer node 952, 954, 956 can respond to discovery requests, and traffic from such nodes 952, 954, 956 is exposed through a traditional port, referenced in FIG. 9 as port 42. Health check 987 can also be provided for the non-port-based routing.

On the consumer side, a second private service connection endpoint 919 is deployed for the discovery service, in addition to first private service connection endpoint 918 used for port-based routing. While the first private service connection endpoint 918 establishes a connection 930 with the service attachment 973 for port-based routing, the second private service connection endpoint 919 establishes a second connection 931 with the second service attachment 983 for the discovery service.

Figure 10:
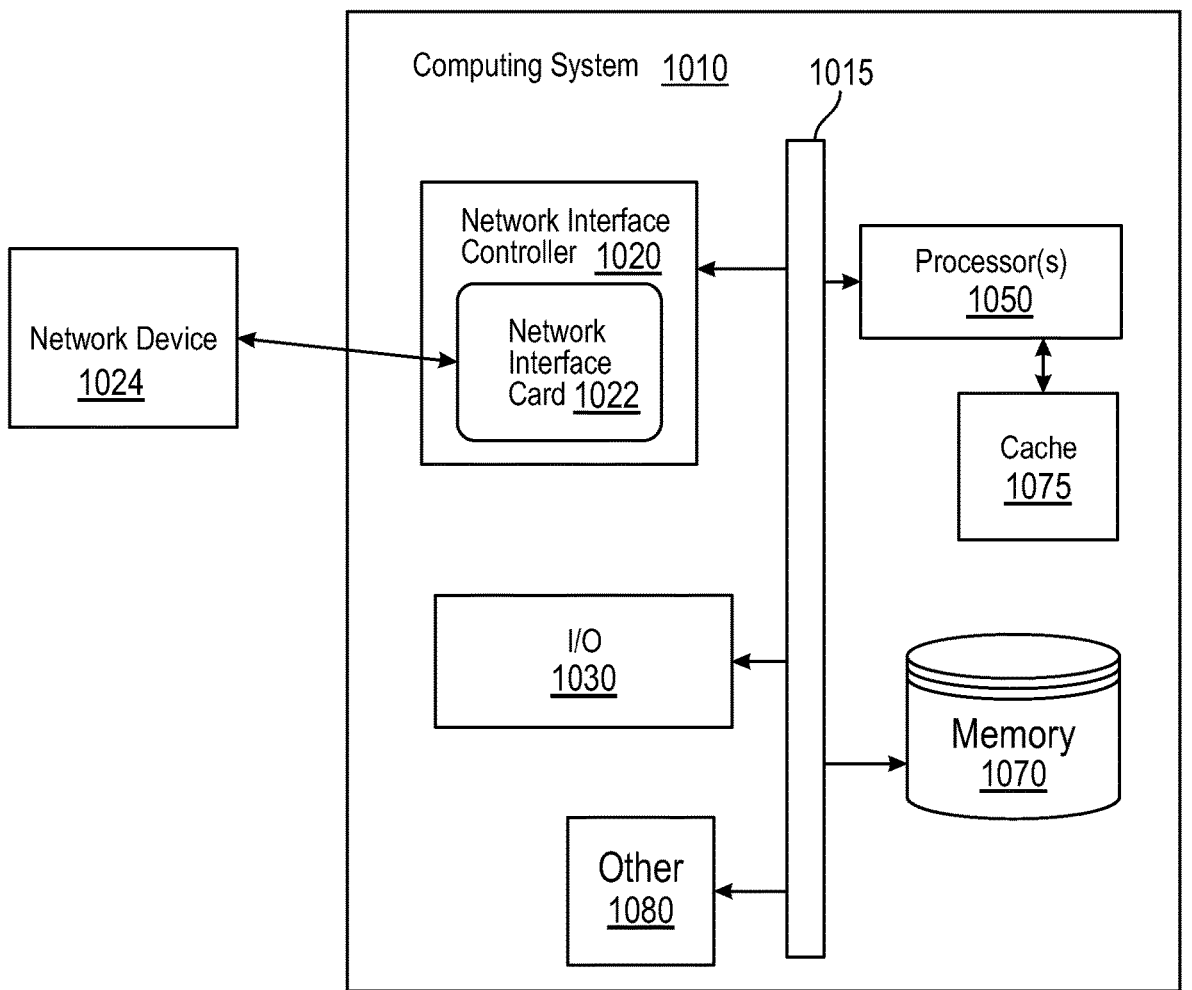
FIG. 10 illustrates an example computing system according to aspects of the disclosure.

FIG. 10 is a block diagram 1000 illustrating an example computer system 110 with which aspects of this disclosure, including the techniques described herein, and any components thereof, can be implemented. In certain aspects, the computer system 1010 may be implemented using hardware or a combination of software and hardware, either in a dedicated server, or integrated into another entity, or distributed across multiple entities.

In some examples, example computing system 1010 can be a user computing system or device. In other examples, a virtual private cloud can consist of one or more example computer systems, similar to computing system 1010, coupled or linked via software and hardware components to operate collectively as a cloud or platform hosting multiple virtual private clouds. In some examples, software such as hypervisors, virtual machine monitors, container orchestration systems, or other software for cloud deployment, scaling, and management can be used on one or more example computer systems to form a virtual private network or a platform to provide, host, and run virtual private networks.

The computing system 110 includes at least one processor 1050 for performing actions in accordance with instructions and one or more memory devices 1070 or 1075 for storing instructions and data. The illustrated example computing system 1010 includes one or more processors 1050 in communication, via a bus 1015, with at least one network interface driver controller 1020 with one or more network interface cards 1022 connecting to one or more network devices 1024, memory 1070, and any other devices 1080, e.g., an I/O interface. The network interface card 1022 may have one or more network interface driver ports to communicate with the connected devices or components. Generally, a processor 1050 executes instructions received from memory. The processor 150 incorporates, or is communicatively coupled to, cache memory 1075.

In more detail, the processor 1050 may be any logic circuitry that processes instructions, e.g., instructions fetched from the memory 1070 or cache 1075. In many embodiments, the processor 1050 is a microprocessor unit or special purpose processor. The computing device 1010 may be based on any processor, or set of processors, capable of operating as described herein. The processor 1050 may be a single core or multi-core processor. The processor 1050 may be multiple processors. In some implementations, the processor 1050 can be configured to run multi-threaded operations. In some implementations, the processor 1050 may host one or more virtual machines or containers, along with a hypervisor or container manager for managing the operation of the virtual machines or containers. In such implementations, the methods shown and described in the figures below can be implemented within the virtualized or containerized environments provided on the processor 1050.

The memory 1070 may be any device suitable for storing computer readable data. The memory 1070 may be a device with fixed storage or a device for reading removable storage media. Examples include all forms of non-volatile memory, media and memory devices, semiconductor memory devices, such as EPROM, EEPROM, SDRAM, and flash memory devices, magnetic disks, magneto optical disks, and optical discs, such as CD ROM, DVD-ROM, etc. A computing system 1010 may have any number of memory devices 1070. In some implementations, the memory 1070 supports virtualized or containerized memory accessible by virtual machine or container execution environments provided by the computing system 1010.

The cache memory 1075 is generally a form of computer memory placed in close proximity to the processor 1050 for fast read times. In some implementations, the cache memory 1075 is part of, or on the same chip as, the processor 1050. In some implementations, there are multiple levels of cache 1075, e.g., L2 and L3 cache layers.

The network interface driver controller 1020 manages data exchanges via the network interface driver 1022 (also referred to as network interface driver ports). The network interface driver controller 1020 handles the physical and data link layers for network communication. In some implementations, some of the network interface driver controller's tasks are handled by the processor 1050. In some implementations, the network interface controller 1020 is part of the processor 1050. In some implementations, a computing system 1010 has multiple network interface controllers 1020. The network interface driver ports configured in the network interface card 1022 are connection points for physical network links. In some implementations, the network interface controller 1020 supports wireless network connections and an interface port associated with the network interface card 1022 is a wireless receiver/transmitter. Generally, a computing device 1010 exchanges data with other network devices 1024 via physical or wireless links that interface with network interface driver ports configured in the network interface card 1022. In some implementations, the network interface controller 1020 implements a network protocol such as Ethernet. In some examples, the network interface driver controller 1020 is used for conversion of certain virtual IP addresses to "real" or physical IP addresses, and vice versa, to enable connectivity between networks described herein.

The other network devices 1024 may be connected to the computing device 1010 via a network interface driver port included in the network interface card 1022. The other network devices 1024 may be peer computing devices, network devices, or any other computing device with network functionality. For example, a first network device 1024 may be a network device such as a hub, a bridge, a switch, or a router, connecting the computing device 110 to a data network such as the internet.

The other devices 1080 may include an I/O interface, external serial device ports, and any additional co-processors or other types of devices. For example, a computing system 1010 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1010 includes an additional device 1080 such as a coprocessor, e.g., a math co-processor can assist the processor 1050 with high precision or complex calculations.

Instructions on computing system 1010 may control various components and functions of computing system 1010. For example, the instructions may be executed to perform any of the methods indicated in this disclosure. In some examples, algorithms can be included as a subset of or otherwise as part of instructions included on computing system 1010. Instructions can include algorithms to execute any of the methods or a subset of the methods described within this disclosure. Additionally, instructions can include algorithms or commands to translate between physical and virtual IP addresses, User interfaces on the computing system 1010 may include a screen which allows a user to interact with computing system 1010, such as a touch screen or buttons. A display can also be included such as an LCD, LED, mobile phone display, electronic ink, or other display to display information about computing system 1010. The user interface can allow for both input from a user and output to a user. A communication interface(s) can include hardware and software to enable communication of data over standards such as Wi-Fi, Bluetooth, infrared, radio-wave, and/or other analog and digital communication standards. Communication interface(s) allow for computing system 1010 to be updated and information generated by computing system 1010 to be shared to other devices. In some examples, communication interface(s) can send information stored in memory to another user device for display, storage or further analysis.

FIG. 11 illustrates a method 1100 for communicating between networks on a cloud service. While the operations are described in a particular order, it should be understood that the operations may be performed in a different order or simultaneously. Moreover, operations may be added or omitted.

In block 1110, a consumer network is coupled to a producer network by a data path. For example, a private service connection is established between a private service connection endpoint in a first network, such as a consumer VPC, and a service endpoint in a second network, such as a producer VPC. The consumer network may, through the private service connection, access a service of the producer network, such as a container, network endpoint group, or load balancer, etc. The consumer network may include a first plurality of workloads and the producer network may include a second plurality of workloads. The workloads may be, for example, containers or virtual machines.

In block 1120, each unique consumer internet protocol (IP) port in the consumer network is mapped to a unique producer IP port in the producer network, such that all ports in the consumer network are exposed on a single IP address which maps to different IP addresses in the producer network. The single IP address of the consumer network may be the endpoint of the data path. Each virtual machine in the producer network may have one respective IP address, and exposes one or more ports on the respective IP address.

In block 1130, data is transmitted from a first port in the consumer network through the single IP address and over the data path to a first port in the producer network.

In block 1140, data from a second port in the consumer network is transmitted through the single IP address and over the data path to a second port in the producer network.

While the transmission of data in blocks 1130 and 1140 originates from different consumer network nodes, and has a destination of different producer network nodes, it is transmitted through a single endpoint on the consumer side coupled to the service attachment on the producer side.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention caimed is:

1. A method of communicating between networks on a cloud service, the method comprising:
    coupling a consumer network to a producer network by a data path;
    mapping each unique consumer transport layer port in the consumer network to a unique producer transport layer port in the producer network, wherein all ports in the consumer network are exposed on a single consumer IP address which maps to different IP addresses in the producer network;
    transmitting data from a first port in the consumer network through the single consumer IP address and over the data path to a first mapping of virtual machine and port in the producer network; and
    transmitting data from a second port in the consumer network through the single consumer IP address and over the data path to a second mapping of virtual machine and port in the producer network.

2. The method of claim 1, wherein the single consumer IP address of the consumer network is an endpoint of the data path.

3. The method of claim 1, wherein the consumer network comprises a first plurality of workloads and the producer network comprises a second plurality of workloads.

4. The method of claim 1, wherein the producer network comprises a plurality of virtual machines.

5. The method of claim 4, wherein each virtual machine in the producer network exposes one or more ports.

6. The method of claim 1, wherein the consumer network and the producer network each comprise a virtual private cloud.

7. The method of claim 1, wherein the consumer network and producer network are running on a distributed computing platform.

8. The method of claim 1, wherein a service to be accessed in the producer network is a container.

9. The method of claim 1, wherein a service to be accessed in the producer network is a group of virtual machines.

10. A system, comprising:
    a consumer network comprising a service endpoint and a first plurality of nodes; and
    a producer network comprising a service attachment and a second plurality of nodes;
    wherein a data path is established between the service endpoint and the service attachment; and
    each unique consumer transport layer port in the consumer network is mapped to a unique producer transport layer port in the producer network, such that wherein all ports in the consumer network are exposed on a single consumer IP address associated with the service endpoint.

11. The system of claim 10, wherein the service endpoint is configured to transmit data destined for any of different IP addresses in the producer network.

12. The system of claim 10, wherein the service endpoint is configured to transmit data from a first port in the consumer network through the single consumer IP address and over the data path to a first mapping of virtual machine and port in the producer network, and to transmit data from a second port in the consumer network through the single consumer IP address and over the data path to a second mapping of virtual machine and port in the producer network.

13. The system of claim 10, wherein the consumer network comprises a first plurality of workloads and the producer network comprises a second plurality of workloads.

14. The system of claim 10, wherein the producer network comprises a plurality of virtual machines.

15. The system of claim 14, wherein each virtual machine in the producer network exposes one or more ports.

16. The system of claim 10, wherein the consumer network and the producer network each comprise a virtual private cloud.

17. The system of claim 10, wherein the consumer network and producer network are running on a distributed computing platform.

18. The system of claim 10, wherein a service to be accessed in the producer network comprises at least one of a container, an internal load balancer, or a network endpoint group.

\* \* \* \* \*